(12) United States Patent
Wang et al.

(10) Patent No.: US 11,403,758 B2
(45) Date of Patent: Aug. 2, 2022

(54) 3D/2D VASCULAR REGISTRATION METHOD AND ITS MEANS

(71) Applicant: BEIJING INSTITUTE OF TECHNOLOGY, Beijing (CN)

(72) Inventors: Yongtian Wang, Beijing (CN); Jian Yang, Beijing (CN); Danni Ai, Beijing (CN); Jingfan Fan, Beijing (CN); Jianjun Zhu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 100 days.

(21) Appl. No.: 16/975,714

(22) PCT Filed: Dec. 6, 2019

(86) PCT No.: PCT/CN2019/000239
§ 371 (c)(1),
(2) Date: Aug. 26, 2020

(87) PCT Pub. No.: WO2020/186371
PCT Pub. Date: Sep. 24, 2020

(65) Prior Publication Data
US 2021/0224980 A1    Jul. 22, 2021

(30) Foreign Application Priority Data

Mar. 20, 2019 (CN) .......................... 201910213001.7

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/33* (2017.01); *G06V 10/75* (2022.01); *G06T 2207/10028* (2013.01); *G06T 2207/30101* (2013.01)

(58) Field of Classification Search
CPC ..................... G06T 7/0012; G06T 7/33; G06T 2207/10028; G06T 2207/30101;
(Continued)

(56) References Cited

U.S. PATENT DOCUMENTS

2016/0005192 A1    1/2016 Royalty et al.

FOREIGN PATENT DOCUMENTS

| CN | 101763642 A | 6/2010 |
| CN | 108898626 A | 11/2018 |
| CN | 109993730 A | 7/2019 |

OTHER PUBLICATIONS

Benseghir, Thomas, Grégoire Malandain, and Regis Vaillant. "A tree-topology preserving pairing for 3D/2D registration." International journal of computer assisted radiology and surgery Oct. 6, 2015: 913-923. https://link.springer.com/article/10.1007/s11548-015-1207-0 (Year: 2015).*

(Continued)

*Primary Examiner* — Claire X Wang
*Assistant Examiner* — Han Hoang
(74) *Attorney, Agent, or Firm* — Bayramoglu Law Offices LLC

(57) ABSTRACT

A 3D/2D vascular registration method includes: according to topological information of vessels in a 3D vascular image, a first vascular image model is obtained, and according to the topological information of vessels in a 2D vascular image, a second vascular image model is obtained; according to the first vascular image model and the second vascular image model, obtain a spatial transformation relationship between the three-dimensional vascular image and the two-
(Continued)

```
According to the topological information of vessels in 3D vascular
image, the first vascular image model is obtained, and according to
the topological information of vessels in 2D vascular image, the          S101
second vascular image model is obtained.

According to the first vascular image model and the second vascular
image model, obtain the spatial transformation relationship between       S102
the three-dimensional vascular image and the two-dimensional
vascular image.
``` dimensional vascular image; wherein, the spatial transformation relationship is used to register the 3D vascular image and the 2D vascular image. The 3D/2D vascular registration method can establish the vascular image model according to the topological information of the vessel in the vascular image model, register according to the vascular image model, so as to give consideration to both high accuracy and high calculation efficiency.

5 Claims, 2 Drawing Sheets

(51) Int. Cl.
  *G06T 7/33* (2017.01)
  *G06V 10/75* (2022.01)

(58) Field of Classification Search
  CPC . G06T 2207/10081; G06T 2207/10121; G06T 2207/20072; G06T 7/344; G06V 10/75; G06V 20/647
  See application file for complete search history.

(56) References Cited

OTHER PUBLICATIONS

Liu, Songbo, et al. "A 3D/2D registration of the coronary arteries based on tree topology consistency matching." Biomedical Signal Processing and Control 38 (2017): 191-199.https://www.sciencedirect.com/science/article/pii/S1746809417301076 (Year: 2017).*

* cited by examiner

According to the topological information of vessels in 3D vascular image, the first vascular image model is obtained, and according to the topological information of vessels in 2D vascular image, the second vascular image model is obtained. — S101

According to the first vascular image model and the second vascular image model, obtain the spatial transformation relationship between the three-dimensional vascular image and the two-dimensional vascular image. — S102

FIG. 1

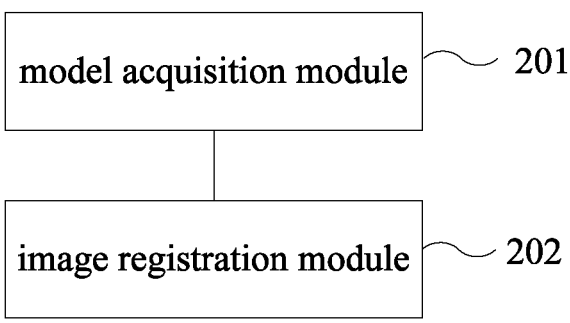

FIG. 2

3D/2D VASCULAR REGISTRATION METHOD AND ITS MEANS

CROSS-REFERENCE TO THE RELATED APPLICATIONS

This application is the national stage entry of International Application No. PCT/CN2019/000239, filed on Dec. 6, 2019, which is based upon and claims priority to Chinese Patent Application No. 201910213001.7, filed on Mar. 20, 2019, the entire contents of which are incorporated herein by reference.

TECHNICAL FIELD

The present invention relates to the technical field of image processing, and particularly to a 3D/2D vascular registration method and its means.

BACKGROUND

Three dimensional (3D) vascular information comes from preoperative CT angiography (CTA) imaging. The contrast agent is injected from the subcutaneous vein. When it passes through the liver, it is scanned in the venous phase. Therefore, the vascular data extracted from CTA has a clear structure and is easy to identify and diagnose. Two dimensional (2D) vascular information is extracted in real time from the intraoperative angiography image, and the contrast agent is injected from the catheter that extends into the vascular cavity, so the local small vessels can be imaged clearly. In order to make use of the respective advantages of 3D and 2D vascular imagesvascular image, it is necessary to fuse 3D and 2D vascular imagesvascular image. The fusion of 3D and 2D vascular images can be realized by 3D/2D registration of vascular images, which shows that after 3D vascular transformation and C-arm perspective projection imaging, the 3D vascular after projection and 2D vascular during operation reach the same spatial position in anatomical structure. At present, there are many methods for 3D/2D vascular image registration, such as registration based on numerical optimization, registration based on gray level and gradient information and registration based on objective function optimization. However, the above registration methods can not reduce the calculation time while maintaining high accuracy. The high-precision registration algorithm usually uses complex calculation model, which requires more calculation time; and some registration methods rely on the initial pose, which requires manual initialization correction or complex registration initialization, resulting in low registration accuracy and/or long calculation time. Therefore, the current 3D/2D vascular image registration method has not achieved a good balance in the pursuit of high accuracy, high computational efficiency and automatic.

To sum up, the existing 3D/2D vascular registration methods are difficult to give consideration to both high accuracy and high calculation efficiency.

SUMMARY

The technical problem addressed by the present invention is to overcome the deficiency in the prior art, and to provide a 3D/2D vascular registration method and its means, which can solve or at least partially solve the defects in the prior art that are difficult to take into account both high accuracy and high computing efficiency.

In the first aspect, the embodiment of the invention provides a 3D/2D vascular registration method, including:

According to the topological information of vessels in 3D vascular image, the first vascular image model is obtained, and according to the topological information of vessels in 2D vascular image, the second vascular image model is obtained.

According to the first vascular image model and the second vascular image model, the spatial transformation relationship between the three-dimensional vascular image and the two-dimensional vascular image is obtained.

The spatial transformation relationship is used to register the 3D vascular image and the 2D vascular image.

In the second aspect, the embodiment of the invention provides a 3D/2D vascular registration means, including:

The model acquisition module is used to obtain the first vascular image model according to the topological information of vessels in the 3D vascular image and the second vascular image model according to the topological information of vessels in the 2D vascular image.

The image registration module is used to obtain the spatial transformation relationship between the 3D vascular image and the 2D vascular image according to the first vascular image model and the second vascular image model.

The spatial transformation relationship is used to register the 3D vascular image and the 2D vascular image.

In the third aspect, the embodiment of the invention provides an electronic device, including a memory, a processor and a computer program stored in the memory and capable of running on the processor. When the program is executed, the steps of realizing the 3D/2D vascular registration method provided by any of the various possible realization methods of the first aspect are realized. In the fourth aspect, the embodiment of the invention provides a non transient computer-readable storage medium on which a computer program is stored. When the computer program is executed by the processor, the steps of realizing the 3D/2D vascular registration method provided by any of the various possible realization methods in the first aspect are realized.

The 3D/2D vascular registration method and its means provided by the embodiment of the invention can establish the vascular image model according to the topological information of vessels in the vascular image model, register according to the vascular image model, do not depend on the initial pose, can automatically obtain the registration result, the model used is simple, the matching and registration algorithm is simple, can reduce the calculation amount and improve the calculation efficiency in the registration process. Making use of the invariance of topology information of vessels can eliminate the interference of pseudo intersection, pose, image acquisition angle, and improve the accuracy of registration, so as to give consideration to both high accuracy and high calculation efficiency.

BRIEF DESCRIPTION OF THE DRAWINGS

In order to explain the embodiments of the invention or the technical solutions in the prior art more clearly, the following will give a brief introduction to the drawings needed in the embodiments or the prior art description. It is obvious that the drawings in the following description are some embodiments of the invention. For ordinary technicians in the art, without any creative work, they can also use the following drawings to get other drawings.

FIG. 1 shows a flow diagram of 3D/2D vascular registration method according to the embodiment of the invention.

FIG. 2 shows a structure diagram of 3D/2D vascular registration means according to the embodiment of the invention.

DETAILED DESCRIPTION OF THE EMBODIMENTS

Figure 3:
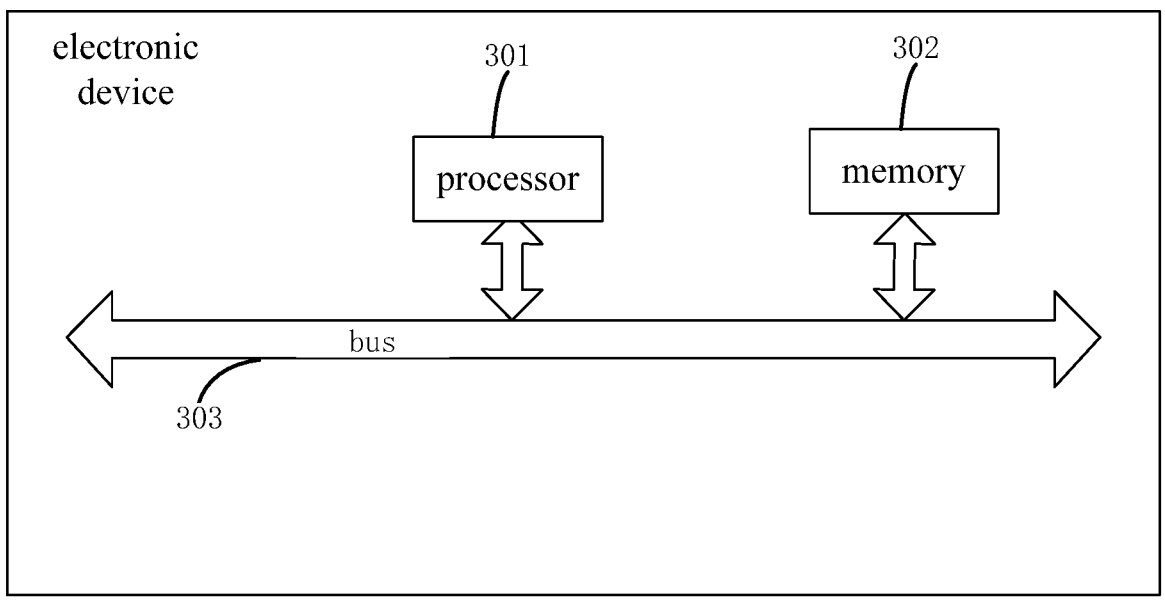
FIG. 3 is the entity structure diagram of the electronic device according to the embodiment of the invention.

In order to make the purpose, technical scheme and advantages of the embodiments of the invention clearer, the technical solution in the embodiments of the invention will be described clearly and completely in combination with the drawings in the embodiments of the invention. Obviously, the described embodiments are part of the embodiments of the invention, not all of them. Based on the embodiments in the invention, all other embodiments obtained by those skilled in the art without creative labor belong to the scope of protection of the invention.

In order to overcome the above problems of the prior art, the embodiments of the invention provide a 3D/2D vascular registration method and its means. The invention idea is to realize 3D/2D vascular registration method which does not depend on the initial pose based on the invariance of dimensional change and rotation translation transformation of the vascular topology, and to maintain acceptable accuracy and time effect in application.

FIG. 1 shows a flow diagram of 3D/2D vascular registration method according to the embodiment of the invention. As shown as FIG. 1, this method comprises: in step S101, according to the topological information of vessels in 3D vascular image, the first vascular image model is obtained, and according to the topological information of vessels in 2D vascular image, the second vascular image model is obtained.

It should be noted that the anatomical structure of blood vessels is strictly dendriform, so 3D/2D registration of vascular images can be realized by using this feature.

Three dimensional and two dimensional vascular images are three-dimensional and two-dimensional vascular images of the same vascular tree.

In order to facilitate the registration, it is necessary to establish a three-dimensional first vascular image model based on the three-dimensional vascular image and a two-dimensional second vascular image model based on the two-dimensional vascular image.

The vessel node contains end points and bifurcation points of the vascular tree. When establishing the vascular image model, the end points and bifurcation points of the vascular tree can be regarded as the nodes in the vascular image model. For the vascular branch in the vascular tree, the geodesic between the two nodes in the vascular graph model corresponding to the vascular nodes at both ends of the vascular branch can be used as the edge of the vascular image model. Through the above steps, the vascular tree in the 3D vascular image can be transformed into the first vascular image model, and the vascular tree in the 2D vascular image can be transformed into the second vascular image model.

The nodes in the vascular image model are used to represent the vascular nodes of the vascular tree in the vascular image. The edges in the vascular image model are used to represent the vascular branches of the vascular tree in the vascular image.

The location and connection of vascular nodes reflect the topological information of vascular tree. Therefore, the vascular image model based on the location and connection of vascular nodes can also reflect the topological information of vascular tree. Because the topological information of vascular tree is invariable in 3D or 2D space, and the rotation translation transformation of vascular tree does not change the topological information of vascular tree, 3D/2D registration of vascular image can be carried out based on vascular image model.

Because of the directionality of blood vessels, blood flows in from the inlet and out from the outlet. Therefore, the end points of the vascular tree include the inlet and outlet. For the vascular model, the end point with the largest radius can be selected as the inlet, and the remaining end points of the vascular trees are all the outlets. The direction of the vascular branch can be determined by automatically traversing the direction flow from the inlet to the outlet.

Because of the overlapping of vascular branches in two-dimensional images caused by perspective projection, the bifurcation points observed in two-dimensional images are considered as pseudo bifurcation points. When establishing a two-dimensional second vascular image model, due to the difficulty in identifying the pseudo bifurcation, the pseudo bifurcation point is retained in the embodiment of the invention, that is, the pseudo bifurcation point is also used as the bifurcation point. For the two-dimensional vascular image model with pseudo bifurcation, because of the ring structure, we can use an automatic traversal method to obtain the direction of vascular branches, some of which are determined as two directions.

Based on graph theory, the first vascular image model and the second vascular image model can be expressed as $G^A=\{N^A, E^A\}$ and $G^B=\{N^B, E^B\}$ respectively. Wherein, $N^A$ represents the set of nodes in the first vascular image model; $N^B$ represents the set of nodes in the second vascular image model; $E^A$ represents the set of edges connecting two nodes in the first vascular image model; $E^B$ represents the set of edges connecting two nodes and redundant edges in the second vascular image model. The nodes include end point and bifurcation point.

It should be noted that since there is a pseudo bifurcation point in the two-dimensional vascular image, an edge in the first vascular image model will be divided into two sides by the node corresponding to the pseudo bifurcation point in the second vascular image model, resulting in the edge matching in the second vascular image model that does not exist in the first vascular image model. In order to avoid the above situation, the second vascular image model also needs to be constructed redundant side. Redundant edge refers to the edge constructed by the connection across nodes. Redundancy R indicates that two nodes can be connected across R intermediate nodes.

For any node, the attributes of the node can include at least one of the coordinates, the corresponding vascular radius, and the degree of association. The degree of association refers to the number of nodes directly connected to the node.

For any edge (or redundant edge), the attributes of the edge can include at least one of the length and sequence point sets.

Any edge can correspond to a set of sequential points. The points in the point set of the sequence include two end points of the edge.

In step S102, according to the first vascular image model and the second vascular image model, the spatial transformation relationship between the three-dimensional vascular image and the two-dimensional vascular image is obtained.

Wherein, the spatial transformation relationship is used to register 3D and 2D vascular images.

The definition of 3D vascular image registration and 2D vascular image registration is to find a spatial transformation relationship, so that the 3D vascular image and 2D vascular image corresponding to the anatomical structure in the spatial position is consistent.

The registration of 3D and 2D vascular images includes two aspects: vascular matching and location registration. Vascular matching refers to the determination of the corresponding relationship between the three-dimensional vascular image and the two-dimensional vascular image. Location registration refers to the determination of the spatial position transformation relationship between the 3D vascular image and the matched vascular branches in the 2D vascular image.

For any vascular branch in 3D vascular image and any vascular branch in 2D vascular image, if they match, they can be recorded as 1; if they do not match, they can be recorded as 0.

Since the pseudo intersection point and redundant edge are considered in the embodiment of the invention, the corresponding relationship between each edge in the first vascular image model and each edge and redundant edge in the first vascular image model can be determined according to the redundant image matching method, so as to determine the corresponding relationship between each vascular branch in the three-dimensional vascular image and each vascular segment in the two-dimensional vascular image. Redundancy R can be used for the complexity of redundant graph matching.

It can be understood that redundant graph matching includes node matching and edge matching. For any node in the second vascular image model corresponding to the pseudo bifurcation point, this node cannot match with each node in the first vascular image model, while for any edge divided by the node corresponding to the pseudo bifurcation point in the second vascular image model, this edge cannot match with each edge in the first vascular image model. Therefore, the interference of pseudo bifurcation points on 3D/2D registration can be eliminated and the accuracy of registration can be improved. Redundant graph matching has higher robustness and accuracy than traditional graph matching.

According to the results of vascular matching, we can use any of the existing methods of location registration to obtain the spatial transformation relationship as the result of location registration. According to the spatial transformation relationship, the spatial position of the vascular tree in the 3D vascular image can be transformed, so that the spatial position of the vascular tree in the transformed 3D vascular image is consistent with the spatial position of the vascular tree in the 2D vascular image.

In the embodiment of the invention, the vascular image model is established according to the topological information of the vascular image, and the registration is carried out according to the vascular image model, which does not depend on the initial pose, and can automatically obtain the registration result. The model used is simple, the matching and registration algorithm is simple, which can reduce the calculation amount and improve the calculation efficiency in the registration process. The interference caused by pseudo intersection, pose, image acquisition angle, etc can be eliminated by using the invariance of the vascular topological information. It can improve the accuracy of registration, which can take into account both high accuracy and high calculation efficiency.

Based on the contents of the above embodiments, according to the first vascular image model and the second vascular image model, the specific steps of obtaining the spatial transformation relationship between the three-dimensional vascular image and the two-dimensional vascular image include: according to the first vascular image model and the second vascular image model, obtaining the intermediate matching relationship between each vascular feature point in the three-dimensional vascular image and each vascular feature point in the two-dimensional vascular image, and rigid registration results between three-dimensional vascular image and two-dimensional vascular image.

It can be understood that location registration can be divided into rigid registration and elastic registration. Because of the registration of 3D and 2D vascular images of the same vascular tree, the position difference between 3D and 2D vascular images is mainly reflected in rotation and translation, so rigid registration is needed to determine the main position transformation relationship. In addition, due to the spontaneous movement of the organ where the blood vessel is located, the organ may change in size, shape or volume, usually flexible deformation, which is characterized by the overall smoothness, resulting in the difference of partial blood vessels in the three-dimensional and two-dimensional blood vessel images due to the different local deformation. Therefore, after rigid registration, it is necessary to perform elastic registration to achieve the registration of internal deformation. Elastic registration is unrigid registration.

Since the initial pose is independent, the spatial transformation of vascular nodes in the vascular image will affect the result of vascular matching. In order to obtain more accurate vascular matching results and rigid registration results, a method of alternating rigid transformation matrix and matching relationship can be used to obtain the intermediate matching relationship between each vascular feature point in the three-dimensional vascular image and each vascular feature point in the two-dimensional vascular image through multiple iterations, as well as the rigid registration results between the three-dimensional vascular image and the two-dimensional vascular image.

Vascular feature points include vascular nodes and vascular branch points. The vascular branch point is the point of the non vascular node selected from the side vascular segment. For any vascular feature point, there are points corresponding to this point in the vascular image model. The points corresponding to this point are called the feature points in the vascular image model.

Based on the first vascular image model and the second vascular image model, the steps of alternately calculating the rigid transformation matrix and matching relationship are as follows.

In the case of no spatial transformation, according to the preset optimization method to match the blood vessels, the matching relationship between each vascular feature point in the three-dimensional vascular image and each vascular feature point in the two-dimensional vascular image is obtained as the first intermediate matching relationship.

According to the first matching relation, the first rigid transformation matrix is obtained.

According to the first rigid transformation matrix and the preset optimization method to match the blood vessels, the matching relationship between the three-dimensional vascular image and the two-dimensional vascular image is obtained as the second intermediate matching relationship.

By analogy, repeat the above process until the obtained rigid transformation matrix and matching relationship converge. The last rigid transformation matrix is determined as the result of rigid registration between 3D vascular image and 2D vascular image, and the last intermediate matching relationship is taken as the final intermediate matching relationship.

According to the first vascular image model, the second vascular image model and the intermediate matching relationship, the matching relationship between each vascular feature point in the three-dimensional vascular image and each vascular feature point in the two-dimensional vascular image, and the elastic registration results between the three-dimensional vascular image and the two-dimensional vascular image are obtained.

Similarly, the spatial transformation of the vascular nodes in the vascular image will affect the result of the vascular matching because it does not depend on the initial pose. In order to obtain more accurate vascular matching results and elastic registration results, the method of alternating calculation of elastic registration results and matching relationship can be used to obtain the matching relationship between each vascular feature point in the three-dimensional vascular image and each vascular feature point in the two-dimensional vascular image, as well as the elastic registration results between the three-dimensional vascular image and the two-dimensional vascular image through multiple iterations.

Based on the first vascular image model and the second vascular image model, the steps of alternately calculating the elastic transformation matrix and matching relationship are as follows. In the case that the rigid registration results obtained according to the above steps are rigid transformed without elastic transformation, the vascular matching is carried out according to the preset optimization method, and the matching relationship between each vascular feature point in the three-dimensional vascular image and each vascular feature point in the two-dimensional vascular image is obtained as the first matching relationship.

According to the first matching relation, the first elastic transformation matrix is obtained.

According to the first elastic transformation matrix and the preset optimization method to vascular matching, the matching relationship between vascular feature points in the three-dimensional vascular image and vascular feature points in the two-dimensional vascular image is obtained as the second matching relationship.

By analogy, repeat the above process until the obtained elastic transformation matrix and matching relationship converge. The last elastic transformation matrix is determined as the elastic registration result between 3D and 2D vascular images, and the last matching relationship is taken as the final matching relationship.

When performing elastic registration, any elastic registration method can be adopted, and the embodiment of the invention does not have specific restrictions on this.

For example, thin plate spline method can be used to control deformation. Specifically, the control points are placed evenly in 3D vascular space at preset intervals, each of which has three degrees of freedom of displacement. The local displacement of 3D vascular points can be obtained by interpolation of the displacement vector of the control points, and the displacement of the control points is the parameter of elastic registration. The elastic transformation matrix can be obtained by Powell optimization method.

According to the results of rigid registration and elastic registration, the spatial transformation relationship is obtained.

Specifically, after obtaining the rigid registration results and elastic registration results between 3D and 2D vascular images, the spatial transformation relationship between 3D and 2D vascular images can be obtained by superimposing the rigid registration results and elastic registration results.

By combining rigid registration and elastic registration, the embodiment of the invention obtains the spatial transformation relationship between the 3D vascular image and the 2D vascular image, and can obtain more accurate registration results.

Based on the contents of the above embodiments, according to the first vascular image model and the second vascular image model, obtain the intermediate matching relationship between vascular feature points in the three-dimensional vascular image and vascular feature points in the two-dimensional vascular image, and the formula of the rigid registration result between the three-dimensional vascular image and the two-dimensional vascular image is as follows.

$$\{T^*, \pi^*\} = \underset{T,\pi}{\mathrm{argmin}}\left\{\sum_i \sum_j \pi_{ij} d(Proj(T(p_i^A)), p_j^B)\right\}$$

Wherein, $T^*$ represents the rigid registration result; $\pi^*$ represents the intermediate matching relationship; $p_i^A$ represents the i-th feature point in the first vascular image model; $p_j^B$ represents the j-th feature point in the second vascular image model; $d(\square)$ represents the distance; $Proj(\square)$ represents the transmission projection operator; T represents the rigid transformation matrix; $\pi_{ij}$ represents the elements in the i-th row and j-th column of the feature point matching matrix $\pi$.

Specifically, according to the first vascular image model and the second vascular image model, the intermediate matching relationship between vascular feature points in the three-dimensional vascular image and vascular feature points in the two-dimensional vascular image, as well as the steps of the rigid registration results between the three-dimensional vascular image and the two-dimensional vascular image can be obtained, which can be expressed by the following formula 1.

$$\{T^*, \pi^*\} = \underset{T,\pi}{\mathrm{argmin}}\left\{\sum_i \sum_j \pi_{ij} d(Proj(T(p_i^A)), p_j^B)\right\}$$

$T^*$ and $\pi^*$ can be solved by any optimization algorithm. $d(\square)$ represents distance, which can be Euclidean distance, Mahalanobis distance, cosine distance or Manhattan distance.

For a given feature point matching matrix $\pi$, $\pi$ in the matrix form can be rewritten as a mapping $\pi(i)=j \Leftrightarrow \pi_{ij}=1$, thus simplifying formula 1 to formula 2 as follows.

$$T^* = \underset{T}{\mathrm{argmin}}\left\{\sum_i d(Proj(T(p_i^A)), p_{\pi(i)}^B)\right\}$$

Because the rigid transformation of blood vessels includes three degrees of freedom of rotation and three degrees of freedom of translation, the closed solution with time complexity O(n) can be used to solve formula 2 and obtain the rigid registration results. The specific steps are as follows. The coordinates of n 3D points $p_i^A$ are recorded by the weighting of four virtual control points $\{v_j^{(w)}, j=1, 2, 3, 4\}$, in which the superscript (w) represents the world coordinate system and the superscript (c) represents the camera coordinate system, and the camera refers to the camera that collects 3D vascular images;

$$p_i^{A(w)} = \sum_{j=1}^{4} \alpha_{ij} v_j^{(w)};$$

Wherein, $$\sum_{j=1}^{4} \alpha_{ij} = 1;$$

The coordinate information of $p_i^{A(w)}$ can be obtained by coefficient $\alpha_{ij}$ and virtual control point. The transformation mapping $T: p_i^{A(w)} \to p_i^{A(c)}$ from the world coordinate system to the 3D point in the camera coordinate system is equivalent to the mapping $T: v_j^{(w)} \to v_j^{(c)}$ between the virtual control point pairs. Therefore, the rigid transformation matrix T can be obtained by calculating the coordinates of the control point $\{v_j^{(c)}\}$ in the camera coordinate system.

In different coordinate systems, virtual control points and 3D vascular points have the same coefficients $\alpha_{ij}$. Therefore, $$p_i^{A(c)} = \sum_{j=1}^{4} \alpha_{ij} v_j^{(c)}.$$

Since the matching matrix $\pi$ of feature points has been given, it is assumed that the coordinates of each 3D point (i.e. the feature point in the first vascular image model) after projection are consistent with the coordinates of its corresponding 2D point (i.e. the feature point in the second) vascular image model), $\text{Proj}(T(p_i^{A(w)})) = p_{\pi(i)}^{B}$.

Because $T(p_i^{A(w)}) = p_i^{A(c)}$, $\text{Proj}(T(p_i^{A(w)})) = p_{\pi(i)}^{B}$ can be rewriten to formula 3 as follows.

$$\forall i, \omega_i \begin{bmatrix} p_{\pi(i)}^{B} \\ 1 \end{bmatrix} = H p_i^{A(c)} = H \sum_{j=1}^{4} \alpha_{ij} v_j^{(c)}$$

Wherein, H refers to camera internal calibration matrix; co, refers to scalar projection parameter. By solving formula 3, the coordinates of four virtual control points in camera coordinate system can be obtained, and the mapping $T: v_j^{(w)} \to v_j^{(c)}$ between virtual control point pairs can be obtained as the result of rigid registration.

It should be noted that the number of virtual control points can be selected according to the actual needs, and its phase is not limited to 4. When the number of virtual control points is not 4, the steps to obtain the rigid registration results are similar to the steps when the number of virtual control points is 4, which will not be discussed here.

It should be noted that according to the first vascular image model, the second vascular image model and the intermediate matching relationship, the matching relationship between vascular feature points in the three-dimensional vascular image and vascular feature points in the two-dimensional vascular image, as well as the elastic registration result between the three-dimensional vascular image and the two-dimensional vascular image can also be expressed by Formula 1 or Formula 2. At this time, T* in Formula 1 or formula 2 represents elastic registration result; π* represents matching relationship.

The embodiment of the invention can obtain more accurate registration results by obtaining rigid registration results and intermediate matching relations.

Based on the contents of the above embodiments, the specific steps of obtaining the feature point matching matrix include: according to the first vascular image model and the second vascular image model, obtaining the matching relationship between nodes in the first vascular image model and nodes in the second vascular image model.

Wherein nodes include end points and bifurcation points.

For a given rigid registration result or elastic registration result, according to the transformation relationship, based on the first vascular image model and the second vascular image model, redundant image matching can be carried out to obtain the matching relationship $\pi^N$ between nodes in the first vascular image model and nodes in the second vascular image model.

For any node in the first vascular image model and any node in the second vascular image model, if they match, they can be recorded as 1; if they do not match, they can be recorded as 0.

According to the matching relationship between nodes in the first vascular image model and nodes in the second vascular image model, the matching relationship between edges in the first vascular image model and edges in the second vascular image model and redundant edges is obtained.

After getting the matching relationship between nodes, the edge in the first vascular image model is used as a reference to search for the corresponding edge (or redundant edge) in the second vascular image model, so as to obtain the matching relationship between each edge in the first vascular image model and each edge and redundant edge in the second vascular image model. According to the matching relationship between each edge in the first vascular image model and each edge and redundant edge in the second vascular image model, the matching relationship between edges in the first vascular image model and edges and redundant edges in the second vascular image model can be obtained.

Specifically, for any edge $e_u^A \in E^A$ and any edge (or redundant edge) $e_v^B \in E^B$, if the condition $\pi_{u^1,v^1}^{N} \Box \pi_{u^\#,v^\#}^{N} = 1$ is satisfied, then the edge (or redundant edge) $e_v^B \in E^B$ is determined to match the edge $e_u^A \in E^A$. Wherein, u, v respectively represent the index (such as number) of the edge (or redundant edge), $u^1$, $v^1$ respectively represent the starting point of the edge, and $u^\#$, $v^\#$ respectively represent the ending point of the edge (due to the direction of the blood vessel).

It should be noted that if there is a ring in the second vascular image model, it will result in a case that one edge of the first vascular image model matches multiple edges and redundant edges in the second vascular image model. In order to determine the best matching edge from multiple matching edges and redundant edges, one best matching edge can be determined according to the discrete Fréchet distance as the final match result.

According to the matching relationship between edges in the first vascular image model and edges and redundant edges in the second vascular image model, the feature point matching matrix is obtained.

According to the matching relationship $\pi^E$ between edges in the first vascular image model and edges and redundant edges in the second vascular image model, by combining the curve matching results of all corresponding edges, dense node matching can be obtained, and Dynamic Time Warping (DTW) can be used to obtain the matching relationship between branch points in the first vascular image model and branch points in the second vascular image model. Since the feature points include nodes and branch points, the feature point matching matrix can be obtained according to the matching relationship between nodes in the first vascular image model and nodes in the second vascular image model, and the matching relationship between branch points in the first vascular image model and branch points in the second vascular image model.

For any branch point in the first vascular image model and any branch point in the second vascular image model, if they match, they can be recorded as 1; if they do not match, they can be recorded as 0.

In the embodiment of the invention, by node matching, edge matching and branch point matching, the feature point matching matrix can be obtained, and more accurate vascular matching results can be obtained, so as to improve the accuracy of registration.

Based on the contents of the above embodiments, according to the first vascular image model and the vascular image model, the specific steps to obtain the matching relationship between nodes in the first vascular image model and nodes in the second vascular image model include:

According to the method of redundance image matching, the node matching matrix which maximizes the objective function is obtained as the matching relationship between nodes in the first vascular image model and nodes in the second vascular image model.

The calculation formula of the objective function is $$S(\pi^N) = vec(\pi^N)^T K vec(\pi^N)$$

Wherein, $\pi^N$ is one-to-one mapping of the node set $N^A$ and $N^B$; $\pi^N \in \{0,1\}^{|N^A| \times |N^B|}$; vec(□) represents vectorization; K represents the correlation matrix, $K \in R^{|N^A||N^B| \times |N^A||N^B|}$; |□| is the norm operator, representing the number of elements in the set; $N^A$ represents the set of nodes in the first vascular image model; $N^B$ represents the set of nodes in the second vascular image model. Specifically, for the node set $N^A$ and $N^B$, and the given rigid registration result or elastic registration result, the redundant image matching method can be used to obtain the optimal match $\pi^N \in \{0,1\}^{|N^A| \times |N^B|}$ of $N^A$ and $N^B$ of the maximized objective function S ($\pi^N$).

The correlation matrix K can be obtained according to the quantitative results of the differences between nodes in the first vascular image model $G^A = \{N^A, E^A\}$ and nodes in the second vascular image model $G^A = \{N^A, E^A\}$ and the differences between edges in the first vascular image model and edges in the second vascular image model, so that the correlation matrix K can represent the similarity between the first vascular image model and the second vascular image model.

According to the redundant image matching method, the embodiment of the invention obtains the matching relationship between nodes in the first vascular image model and nodes in the second vascular image model of the maximization objective function, and can obtain more accurate node matching results, so as to obtain more accurate vascular matching results according to the node matching results, and further improve the accuracy of the registration.

Based on the contents of the above embodiments, the correlation matrix is obtained according to the node correlation matrix and the edge correlation matrix. The node correlation matrix is used to represent the similarity between each node in the node set $N^A$ and each node in the node set $N^B$. The edge correlation matrix is used to represent the similarity between each edge in the edge set $E^A$ and each edge or redundant edge in the edge set $E^B$. Wherein, the edge set $E^A$ represents the set of edges connecting two nodes in the first vascular image model; the edge set $E^B$ represents the set of edges connecting two nodes and redundant edges in the second vascular image model.

Specifically, the correlation matrix K can be obtained according to two sub correlation matrices $K^N$ and $K^E$.

The sub correlation matrix $K^N$ is node correlation matrix, $K^N \in R^{|N^A| \times |N^B|}$. Node correlation matrix $K^N \in R^{|N^A| \times |N^B|}$, is used to describe the similarity between each node in the node set $N^A$ and each node in the node set $N^B$.

The sub correlation matrix $K^E$ is edge correlation matrix, $K^E \in R^{|E^A| \times |E^B|}$. Edge correlation matrix $K^E \in R^{|E^A| \times |E^B|}$, is used to describe the similarity between each edge in the edge set $E^A$ and each edge or redundant edge in the edge set $E^B$.

The element values on the diagonal of the correlation matrix K are provided by node correlation matrix $K^N$, and the other element values are provided by edge correlation matrix $K^E$.

The embodiment of the invention obtains the correlation matrix according to the node correlation matrix and the edge correlation matrix, which can more accurately describe the similarity between nodes in the first vascular image model and nodes in the second vascular image model, and the similarity between edges in the first vascular image model and edges in the second vascular image model, so as to obtain more accurate node matching results, so as to obtain more accurate vascular matching results according to the node matching results, and further improve the registration accuracy.

Based on the contents of the above embodiments, it is characterized in that the node correlation matrix is obtained according to the position difference between each node in the node set $N^A$ and each node in the node set $N^B$, the radius difference of the corresponding blood vessel and the difference of the number of connected nodes. The edge correlation matrix is obtained according to the length difference between in each edge in the edge set $E^A$ and each edge or redundant edge in the edge set $E^B$ and Fréchet distance.

It should be noted that the construction of node correlation matrix $K^N$ and edge correlation matrix $K^E$ is the key to obtain more accurate node matching results. We can quantify the difference between nodes in the first vascular image model and nodes in the second vascular image model, and the difference between edges in the first vascular image model and edges in the second vascular image model, and construct the node correlation matrix $K^N$ and the edge correlation matrix $K^E$ according to the quantified results.

The attributes of a node include a coordinate C of a node, a radius r of a vessel and a correlation degree ρ. Therefore, the differences between nodes can be quantified from three aspects to obtain three difference matrices $D^c$, $D^r$, $D^\rho \in R^{|N^A| \times |N^B|}$.

The difference matrix $D^c$ is used to represent the position difference between each node in the node set $N^A$ and each node in the node set $N^B$.

Specifically, the difference matrix $D^c$ can be obtained by calculating the distance between each node in the node set $N^A$ and each node in the node set $N^B$. The distance can be Euclidean distance, Mahalanobis distance, cosine distance or Manhattan distance.

For the i-th node in the node set $N^A$ and the j-th node in the node set $N^B$, the distance between $Proj(T(c_i^A))$ of the i-th node and $c_j^B$ of the j-th node can be taken as the distance between the i-th node in the node set $N^A$ and the j-th node in the node set $N^B$. $Proj(T(c_i^A))$ is the coordinates of the i-th node after the given rigid registration result or elastic registration result (expressed by matrix T) and perspective projection. Wherein, $Proj(\square)$ represents the transmission projection operator, i and j represent the index (such as number) of the node.

The difference matrix $D^r$ is used to represent the difference between the vascular radius corresponding to each node in the node set $N^A$ and the vascular radius corresponding to each node in the node set $N^B$.

The vascular radius corresponding to the node is the vascular radius of the vascular node in the vascular tree corresponding to the node. The vascular radius is used to distinguish between a large vessel and a small vessel.

Specifically, the difference matrix $D^r$ can be obtained by calculating the difference between the vascular radius corresponding to each node in the node set $N^A$ and the vascular radius corresponding to each node in the node set $N^B$.

The difference matrix $D^\rho$ is used to represent the difference between the correlation degree of each node in the node set $N^A$ and that of each node in the node set $N^B$.

Correlation degree $\rho$ is defined as the number of nodes directly connected to this node. The correlation degree $\rho$ can be used to distinguish the endpoint ($\rho=1$) and the bifurcation point ($\rho \geq 3$).

Specifically, the difference matrix $D^\rho$ can be obtained by calculating the difference between the correlation degree of each node in the node set $N^A$ and the correlation degree of each node in the node set $N^B$.

The attributes of an edge include the length $l$ of the edge and the set s of sequential points. Therefore, the difference between edges can be quantified from two aspects to get two difference matrices $D^l$, $D^s \in R^{|E^A| \times |E^B|}$.

The difference matrix $D^l$ is used to represent the length difference between each edge in the edge set $E^A$ and each edge or redundant edge in the edge set $E^B$.

Specifically, the difference matrix $D^l$ is obtained by calculating the length difference between each edge in the edge set $E^A$ and each edge or redundant edge in the edge set $E^B$.

This length can be the geodesic distance. For any edge $e_u^A$ in the edge set $E^A$ and any edge or any redundant edge $e_v^B$ in the edge set $E^B$, it can be obtained by calculating the difference between the geodesic distance $l_u^A$ of edge $Proj(T(c_i^A))$ and the geodesic distance $l_v^B$. $Proj(T(c_i^A))$ is obtained after the given rigid registration result or elastic registration result (expressed by matrix T) and perspective projection. Wherein, u, v respectively represent an index (such as number) of an edge (or a redundant edge).

The difference matrix $D^s$ is used to represent the length difference between each edge in the edge set $E^A$ and each edge or redundant edge in the edge set $E^B$.

Specifically, the difference matrix $D^s$ is obtained by calculating the Fréchet distance between each edge in the edge set $E^A$ and each edge or redundant edge in the edge set $E^B$.

For any edge $e_u^A$ in the edge set $E^A$ and any edge or any redundant edge $e_v^B$ in the edge set $E^B$, it can be obtained by calculating the Fréchet distance between the sequence point set $Proj(T(s_u^A))$ and the sequence point set $s_v^B$ of $e_v^B$ as the Fréchet distance between $e_u^A$ and $e_v^B$. $Proj(T(s_u^A))$ is obtained after the given rigid registration result or elastic registration result (expressed by matrix T) and perspective projection of the sequence point set $s_u^A$ of $e_u^A$.

Therefore, the node correlation matrix $K^N$ and the edge correlation matrix $K^E$ can be calculated by the following formula respectively.

$$K^N = \alpha_1 \exp\left(-\frac{D^c}{\sigma_c}\right) + \alpha_2 \exp\left(-\frac{D^r}{\sigma_r}\right) + \alpha_3 \exp\left(-\frac{D^\rho}{\sigma_\rho}\right)$$

$$K^E = \alpha_4 \exp\left(-\frac{D^l}{\sigma_l}\right) + \alpha_5 \exp\left(-\frac{D^s}{\sigma_s}\right)$$

Wherein, $\sigma_c$, $\sigma_r$, $\sigma_\rho$, $\sigma_l$, $\sigma_s$ is the normalization factor of the difference matrix, which respectively represents the standard deviation of the elements in the difference matrix $D^c$, $D^r$, $D^\rho$, $D^l$, $D^s$; $\alpha_1$, $\alpha_2$, $\alpha_3$, $\alpha_4$, $\alpha_5$ is the weight factor, which respectively measures the contribution value of the difference matrix $D^c$, $D^r$, $D^\rho$, $D^l$, $D^s$ in the node correlation matrix $K^N$ and the edge correlation matrix $K^E$.

The specific value of the weight factor $\alpha_1$, $\alpha_2$, $\alpha_3$, $\alpha_4$, $\alpha_5$ can be determined according to the actual case, and the embodiment of the invention has no specific restriction on it. For example, the weight factors $\alpha_1$, $\alpha_2$, $\alpha_3$, $\alpha_4$, $\alpha_5$ can all be taken as 1.

The embodiment of the invention constructs the node correlation matrix by quantifying the differences between nodes and the edge correlation matrix by quantifying the differences between edges, which can more accurately describe the similarity between nodes in the first vascular image model and nodes in the second vascular image model, and the similarity between edges in the first vascular image model and edges in the second vascular image model, so as to obtain more accurate node matching results, so as to obtain more accurate vascular matching results according to the node matching results, and further improve the registration accuracy.

FIG. 2 is a structural diagram of a 3D/2D vascular registration means provided according to an embodiment of the invention. Based on the contents of the above embodiments, as shown in FIG. 2, the means includes a model acquisition module 201 and an image registration module 202, wherein:

The model acquisition module 201 is used to acquire the first vascular image model according to the topological information of vessels in the 3D vascular image and the second vascular image model according to the topological information of vessels in the 2D vascular image.

The image registration module 202 is used to obtain the spatial transformation relationship between the 3D vascular image and the 2D vascular image according to the first vascular image model and the second vascular image model.

Wherein, the spatial transformation relationship is used to register the 3D vascular image and the 2D vascular image.

Specifically, the model acquisition module 201 takes the end point and bifurcation point of the vascular tree as the node in the vascular image model, uses the geodesic between the two nodes in the vascular image model corresponding to the vascular nodes at both ends of the vascular segment in the vascular tree to represent the vascular segment, obtains nodes and edges, and then constructs the first vascular image model according to the topological information of vessels in the 3D vascular image, and the second vascular image model according to the topological information of vessels in 2D vascular image.

The image registration module 202 performs vascular matching and position registration according to the first vascular image model and the second vascular image model, and obtains the spatial transformation relationship between the three-dimensional vascular image and the two-dimensional vascular image. According to the spatial transformation relationship, the spatial position of the vascular tree in the 3D vascular image can be transformed, so that the spatial position of the vascular tree in the transformed 3D vascular image is consistent with the spatial position of the vascular tree in the 2D vascular image.

The 3D/2D vascular registration means provided by the embodiment of the invention is used to perform the 3D/2D vascular registration method provided by the above embodiments of the invention. The specific methods and processes of each module included in the 3D/2D vascular registration means to realize the corresponding functions are detailed in the above 3D/2D vascular registration method, which will not be described here.

The 3D/2D vascular registration means is used for the 3D/2D vascular registration method of the above embodiments. Therefore, the description and definition in the 3D/2D vascular registration method in the above embodiments can be used for the understanding of each execution module in the embodiment of the invention.

In the embodiment of the invention, the vascular image model is established according to the topological information of the vascular image, and the registration is carried out according to the vascular image model, which does not depend on the initial pose, and can automatically obtain the registration result, the model used is simple, the matching and registration algorithm is simple, can reduce the calculation amount and improve the calculation efficiency in the registration process. Making use of the invariance of topology information of vessels can eliminate the interference of pseudo intersection, pose, image acquisition angle, and improve the accuracy of registration, so as to give consideration to both high accuracy and high calculation efficiency.

FIG. 3 is a structural block diagram of an electronic device provided according to an embodiment of the present invention. Based on the above embodiment, as shown in FIG. 3, the electronic device can include: processor 301, memory 302 and bus 303. Wherein, processor 301 and memory 302 communicate with each other by bus 303. Processor 301 is used to call computer program instructions stored in memory 302 and can run on processor 301 to execute the above 3D/2D vascular registration method provided by the embodiments. For example, it includes: according to the topological information of vessels in 3D vascular image, the first vascular image model is obtained, and according to the topological information of vessels in 2D vascular image, the second vascular image model is obtained. According to the first vascular image model and the second vascular image model, obtain the spatial transformation relationship between the three-dimensional vascular image and the two-dimensional vascular image. Wherein the spatial transformation relationship is used to register the 3D vascular image and the 2D vascular image. Another embodiment of the invention provides a computer program product, which including a computer program stored on a non transient computer-readable storage medium. A computer program includes program instruction. When the program instruction is executed by the computer, the steps of realizing the 3D/2D vascular registration method provided by any of the various possible realization methods are realized. For example, it includes: according to the topological information of vessels in 3D vascular image, the first vascular image model is obtained, and according to the topological information of vessels in 2D vascular image, the second vascular image model is obtained. According to the first vascular image model and the second vascular image model, obtain the spatial transformation relationship between the three-dimensional vascular image and the two-dimensional vascular image. Wherein the spatial transformation relationship is used to register the 3D vascular image and the 2D vascular image.

In addition, the logic instructions in memory 302 can be realized in the form of a software functional unit and can be stored in a computer readable storage medium when sold or used as an independent product. Based on this understanding, the technical solution of the embodiment of the present invention, in essence or the part contributing to the prior art or the part of the technical solution, can be embodied in the form of a software product, which is stored in a storage medium, including several instructions for making a computer device (which can be a personal computer, a server, or a network Devices, etc.) perform all or part of the steps of the methods of embodiments of the present invention. The aforementioned storage media includes: U disk, mobile hard disk, ROM (read-only memory), RAM (random access memory), disk or optical disk and other media that can store program code.

Another embodiment of the invention provides a non transient computer-readable storage medium on which a computer program is stored. The computer instruction causes the computer to perform the 3D/2D vascular registration method provided by methods of the embodiments. For example, it includes: according to the topological information of vessels in 3D vascular image, the first vascular image model is obtained, and according to the topological information of vessels in 2D vascular image, the second vascular image model is obtained. According to the first vascular image model and the second vascular image model, obtain the spatial transformation relationship between the three-dimensional vascular image and the two-dimensional vascular image. Wherein the spatial transformation relationship is used to register the 3D vascular image and the 2D vascular image.

The embodiment of the means described above is only schematic, in which the unit described as a separation part can be or may not be physically separated, the part displayed as a unit can be or may not be a physical unit, that is, it can be located in one place, or it can also be distributed to multiple network units. Some or all of the modules can be selected according to the actual needs to achieve the purpose of the embodiment. Those skilled in the art can understand and implement it without paying creative labor.

By the description of the above embodiments, those skilled in the art can clearly understand that each embodiment can be realized by means of software plus necessary general hardware platform, of course, it can also be realized by hardware. In such an understanding, the above technical solution in essence or the part contributing to the prior art can be embodied in the form of a software product, which can be stored in a computer-readable storage medium, such as ROM/RAM, disk, optical disk, etc., including a number of instructions for making a computer device (which can be a personal computer, server, or network device, and so on) carry out a method of each embodiment or some parts of the embodiments.

Finally, it should be noted that the above embodiments are only used to explain the technical solution of the invention, not to limit it. Although the invention has been described in detail with reference to the above embodiments, those skilled in the art should understand that they can still modify the technical solutions recorded in the above embodiments, or replace some of the technical features equally. These modifications or substitutions do not make the essence of the corresponding technical solution depart from the spirit and scope of the technical solutions of the embodiments of the present invention.

What is claimed is:

1. A 3D/2D vascular registration method, comprising:

according to topological information of a plurality of vessels in a three-dimensional vascular image, a first vascular image model is obtained, and according to topological information of a plurality of vessels in a two-dimensional vascular image, a second vascular image model is obtained, according to the first vascular image model and the second vascular image model, a spatial transformation relationship between the three-dimensional vascular image and the two-dimensional vascular image is obtained, the spatial transformation relationship is used to register the three-dimensional vascular image and the two-dimensional vascular image;

wherein the specific steps of obtaining the spatial transformation relationship between the three-dimensional vascular image and the two-dimensional vascular image comprise:

according to the first vascular image model and the second vascular image model, an intermediate matching relationship between a plurality of vascular feature points in the three-dimensional vascular image and a plurality of vascular feature points in the two-dimensional vascular image, and a rigid registration result between the three-dimensional vascular image and the two-dimensional vascular image are obtained, according to the first vascular image model, the second vascular image model and the intermediate matching relationship, the intermediate matching relationship between the plurality of vascular feature points in the three-dimensional vascular image and the plurality of vascular feature points in the two-dimensional vascular image, and a plurality of elastic registration results between the three-dimensional vascular image and the two-dimensional vascular image are obtained, and according to the rigid registration result and the plurality of the elastic registration results, the spatial transformation relationship is obtained;

the method further comprises:

according to the first vascular image model and the second vascular image model, obtaining the intermediate matching relationship between the plurality of vascular feature points in the three-dimensional vascular image and the plurality of vascular feature points in the two-dimensional vascular image, and a formula of the rigid registration result between the three-dimensional vascular image and the two-dimensional vascular image is as follows:

$$\{T^*, \pi^*\} = \underset{T,\pi}{\operatorname{argmin}}\left\{\sum_i \sum_j \pi_{ij} d(Proj(T(p_i^A)), p_j^B)\right\},$$

wherein $T^*$ represents the rigid registration result; $\pi^*$ represents the intermediate matching relationship; $p_i^A$ represents an i-th feature point in the first vascular image model; $p_j^B$ represents a j-th feature point in the second vascular image model; $d(\square)$ represents a distance; $Proj(\square)$ represents a transmission projection operator; T represents a rigid transformation matrix; $\pi_{ij}$ represents a plurality of elements in an i-th row and a j-th column of a feature point matching matrix $\pi$.

2. The method according to the claim 1, the specific steps of obtaining the feature point matching matrix comprises:

according to the first vascular image model and the second vascular image model, the intermediate matching relationship between a plurality of nodes in the first vascular image model and a plurality of nodes in the second vascular image model is obtained, according to the intermediate matching relationship between the plurality of nodes in the first vascular image model and the plurality of nodes in the second vascular image model, the intermediate matching relationship between a plurality of edges in the first vascular image model and a plurality of edges and a plurality of redundant edges in the second vascular image model is obtained, wherein the plurality of nodes comprise a plurality of end points and a plurality of bifurcation points.

3. The method according to claim 2, according to the first vascular image model and the second vascular image model, the specific steps to obtain the intermediate matching relationship between the plurality of nodes in the first vascular image model and the plurality of nodes in the second vascular image model comprises:

according to a method of a redundance image matching, a node matching matrix $\pi^N$, wherein the node matching matrix maximizes an objective function $S(\pi^N)$ obtained as the intermediate matching relationship between the plurality of nodes in the first vascular image model and the plurality of nodes in the second vascular image model, a calculation formula of the objective function is:

$$S(\pi^N) = vec(\pi^N)^T K vec(\pi^N),$$

wherein $\pi^N$ is one-to-one mapping of a node set $N^A$ and $N^B$; $\pi^N \in \{0,1\}^{|N^A| \times |N^B|}$; $vec(\square)$ represents a vectorization; K represents a correlation matrix, $K \in \mathbb{R}^{|N^A||N^B| \times |N^A||N^B|}$; $|\square|$ is a norm operator, representing a number of elements in the node set; $N^A$ represents a set of nodes in the first vascular image model; $N^B$ represents a set of nodes in the second vascular image model.

4. The method according to claim 3, the correlation matrix is obtained according to a node correlation matrix and an edge correlation matrix, wherein the node correlation matrix is used to represent a similarity between each node in the node set $N^A$ and each node in the node set $N^B$, the edge correlation matrix is used to represent a similarity between each edge in an edge set $E^A$ and each edge or each redundant edge in an edge set $E^B$, the edge set $E^A$ represents a set of edges connecting two nodes of the plurality of nodes in the first vascular image model; the edge set $E^B$ represents a set of edges connecting two nodes of the plurality of nodes and the plurality of redundant edges in the second vascular image model.

5. The method according to claim 4, wherein the node correlation matrix is obtained according to a position difference between the each node in the node set $N^A$ and the each node in the node set $N^B$, a radius difference of a corresponding blood vessel and a difference of a number of a plurality of connected nodes, the edge correlation matrix is obtained according, to a length difference between in the each edge in the edge set $E^A$ and the each edge or the each redundant edge in the edge set $E^B$ and a Fréchet distance.

* * * * *